US012640428B2

(12) United States Patent
Usui

(10) Patent No.: US 12,640,428 B2
(45) Date of Patent: May 26, 2026

(54) BATTERY MODULE

(71) Applicant: HONDA MOTOR CO., LTD., Tokyo (JP)

(72) Inventor: Hidemasa Usui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 602 days.

(21) Appl. No.: 18/177,128

(22) Filed: Mar. 2, 2023

(65) Prior Publication Data

US 2023/0318108 A1 Oct. 5, 2023

(30) Foreign Application Priority Data

Mar. 31, 2022 (JP) ................................. 2022-058144

(51) Int. Cl.
*H01M 50/242* (2021.01)
*H01M 50/293* (2021.01)
(52) U.S. Cl.
CPC ....... *H01M 50/242* (2021.01); *H01M 50/293* (2021.01)
(58) Field of Classification Search
None
See application file for complete search history.

(56) References Cited

U.S. PATENT DOCUMENTS

| | | | |
|---|---|---|---|
| 2022/0173454 A1 | 6/2022 | Kogami et al. | |
| 2023/0198069 A1* | 6/2023 | Kim ..................... | H01M 50/133 |
| | | | 429/163 |
| 2024/0162544 A1* | 5/2024 | Li ......................... | H01M 50/209 |
| 2024/0368365 A1* | 11/2024 | Bieber ....................... | C08J 9/34 |

FOREIGN PATENT DOCUMENTS

| | | |
|---|---|---|
| JP | 2016091991 A | 5/2016 |
| JP | 2018026271 A | 2/2018 |
| JP | 2021051876 A | 4/2021 |
| WO | 2020194939 A1 | 10/2020 |

OTHER PUBLICATIONS

Notification of Reasons for Refusal issued Oct. 7, 2025 in the JP Patent Application No. 2022-058144.

* cited by examiner

*Primary Examiner* — Wyatt P McConnell
(74) *Attorney, Agent, or Firm* — CKC & Partners Co., LLC

(57) ABSTRACT
Provided is a battery module including: a battery cell multilayer including a plurality of battery cells that are stacked together; a pair of plate-shaped members provided at both ends of the battery cell multilayer in the stacking direction; a cushioning material sandwiched between the battery cells and/or between the battery cell and the plate-shaped member, the cushioning material including a viscoelastic material; and a displacement tolerant portion tolerant of a displacement of the cushioning material to the outside of the battery cell multilayer.

5 Claims, 6 Drawing Sheets

BATTERY MODULE

This application is based on and claims the benefit of priority from Japanese Patent Application 2022-058144, filed on 31 Mar. 2022, the content of which is incorporated herein by reference.

BACKGROUND OF THE INVENTION

Field of the Invention

The present invention relates to a battery module.

Related Art

In view of climate-related disasters, there is growing interest in electric vehicles to reduce $CO_2$ emission, and a battery module which includes a battery cell multilayer having a plurality of battery cells stacked is being considered for installation in an electric vehicle.

Since a battery cell expands and contracts when charged and discharged, a battery module includes a pair of end plates which are provided at both ends of a battery cell multilayer in the stacking direction, and bind bars which restrain the battery cell multilayer between the pair of end plates (see, for example, Japanese Unexamined Patent Application, Publication No. 2021-051876).

Patent Document 1: Japanese Unexamined Patent Application, Publication No. 2021-051876

SUMMARY OF THE INVENTION

However, a solid-state battery cell (in particular, a lithium metal solid-state battery cell) experiences a large change in volume when charged and discharged, resulting in a change in the dimensions of a battery module. Thus, it is difficult to install the solid-state battery cell in a vehicle.

To address this disadvantage, it is conceivable to configure the solid-state battery cell to be deformable according to the change in volume by disposing a cushioning material between solid-state battery cells and/or between the solid-state battery cell and an end plate; however, energy density is lowered.

On the other hand, it is desirable that even when the solid-state expands due to charge, a surface stress be kept relatively constant, that is, a plateau region of the surface stress be present.

An object of the present invention is to provide a battery module which increases an energy density and can keep a surface stress relatively constant even when a solid-state battery cell is charged.

An aspect of the present invention is directed to a battery module that includes: a battery cell multilayer including a plurality of battery cells that are stacked together; a pair of plate-shaped members provided at both ends of the battery cell multilayer in a stacking direction; a cushioning material sandwiched between the battery cells and/or between the battery cell and the plate-shaped member, the cushioning material including a viscoelastic material; and a displacement tolerant portion tolerant of a displacement of the cushioning material to an outside of the battery cell multilayer.

The viscoelastic material may be a polyurethane thermoplastic elastomer.

Fine particles or a lubricating oil may be present on the surface of the cushioning material.

The fine particles may be talc powder.

The battery module may further include: a restoration promoter configured to promote restoration of the cushioning material which has been displaced to the outside of the battery cell multilayer.

According to the present invention, it is possible to provide a battery module which increases an energy density and can keep a surface stress relatively constant even when a solid-state battery cell is charged.

BRIEF DESCRIPTION OF THE DRAWINGS

FIGS. 4A and 4B are cross-sectional views showing variations of the battery module in FIG. 1;

DETAILED DESCRIPTION OF THE INVENTION

An embodiment of the present invention will be described below with reference to drawings.

Figure 1:
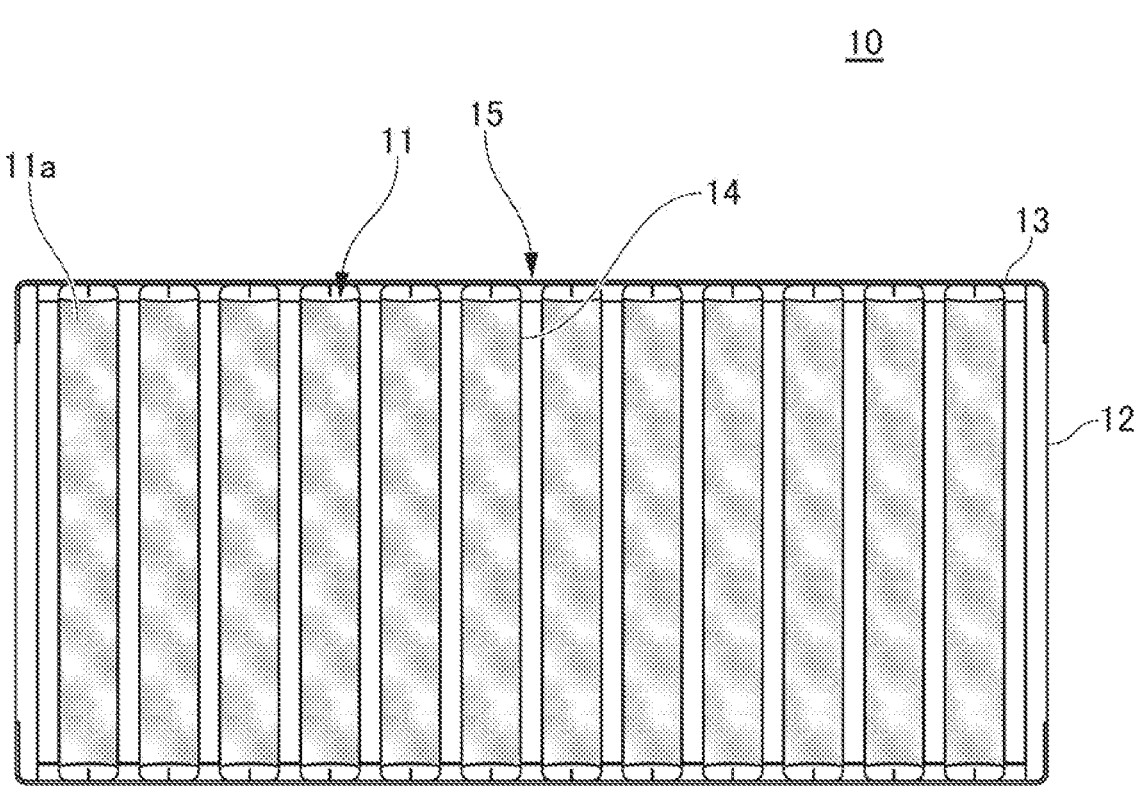
FIG. 1 is a cross-sectional view showing an example of a battery module according to an embodiment.

FIG. 1 shows an example of a battery module in the present embodiment.

The battery module 10 includes: a battery cell multilayer 11 which has a plurality of battery cells 11a stacked; end plates 12 serving as a pair of plate-shaped members which are provided at both ends of the battery cell multilayer 11 in the stacking direction; and bind bars 13 serving as restraint members which restrain the battery cell multilayer 11 between the pair of end plates 12. Here, the bind bars 13 are provided at two locations: in an upper portion and a lower portion in the figure.

In the battery module 10, a cushioning material 14 is sandwiched between the battery cells 11a and between the battery cell 11a and the end plate 12, and the cushioning material 14 includes a viscoelastic material. Here, even when having a small thickness, the viscoelastic material can relatively constantly absorb the surface stress generated by expansion and contraction of the battery cells 11a, with the result that the energy density of the battery module 10 is increased.

The cushioning material 14 may be sandwiched between the battery cells 11a or between the battery cell 11a and the end plate 12.

Although the viscoelastic material is not particularly limited, examples thereof include: rubbers such as silicone rubber, ethylene propylene diene rubber (EPDM), styrene butadiene rubber (SBR) and nitrile rubber (NBR); and elastomers such as a polyurethane thermoplastic elastomer (TPU), a polyamide thermoplastic elastomer (TPA), a polyester thermoplastic elastomer (TPC), an olefin thermoplastic elastomer (TPO), a styrene thermoplastic elastomer (TPS) and a dynamically crosslinked thermoplastic elastomer (TPV). Among them, the polyurethane thermoplastic elastomer is preferable because a large amount of deformation is caused.

Figure 2:
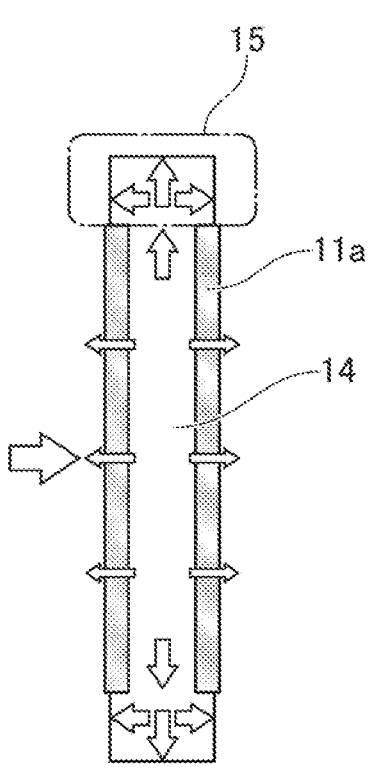
FIG. 2 is a partial enlarged view of the battery module in FIG. 1.

As shown in FIG. 2, the battery module 10 further includes a displacement tolerant portion 15 which is tolerant of a displacement of the cushioning material 14 to the outside of the battery cell multilayer 11 (in an up/down direction in the figure). Hence, even when the battery cell 11a expands due to charge, the cushioning material 14 is displaced to the displacement tolerant portion 15, and thus stress is dispersed, with the result that the surface stress is kept relatively constant, and in other words, a plateau region of the surface stress is present.

In the present specification and the scope of claims, the outside of the battery cell multilayer means a region which is present outside the battery cells when the top surface thereof is viewed in the stacking direction of the battery cells. For example, the displacement tolerant portion 15 corresponding to the cushioning material 14 sandwiched between a plurality of battery cells 11a is arranged between the battery cell multilayer 11 and the bind bar 13.

Figure 3:
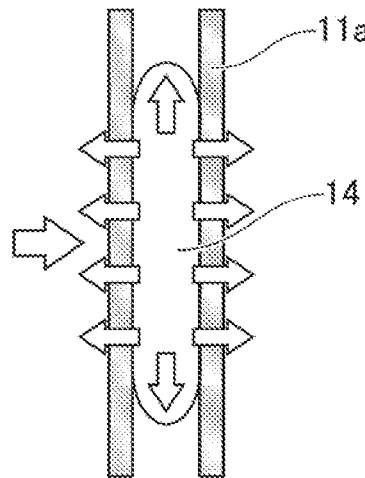
FIG. 3 is a partial enlarged view of a battery module in which a displacement tolerant portion is not present.

By contrast, as shown in FIG. 3, in a case where the displacement tolerant portion 15 is not present, when the battery cell 11a is charged to be expanded, stress is not dispersed, and thus the surface stress is increased quadratically, with the result that a plateau region of the surface stress is not present.

Fine particles or a lubricating oil is preferably present on the surface of the cushioning material 14. In this way, the coefficient of friction of the cushioning material 14 is reduced, and thus it is possible to increase the plateau region of the surface stress.

Although the fine particles are not particularly limited as long as the coefficient of friction of the cushioning material 14 can be reduced, examples thereof include: inorganic fine particles such as talc powder, silica powder and calcium silicate; and organic fine particles such as acrylic resin, melamine resin, wheat flour and potato starch. Among them, the talc powder is preferable in terms of chemical stability and ease of availability.

Although the particle diameter of the fine particles is not particularly limited, the particle diameter is, for example, 40 $\mu$m or less.

The lubricating oil is not particularly limited as long as the coefficient of friction of the cushioning material 14 can be reduced. Grease in which a thickener and an additive are added to the lubricating oil may be present on the surface of the cushioning material 14.

Preferably, the battery module 10 further includes a restoration promoter which promotes restoration of the cushioning material 14 that has been displaced to the outside of the battery cell multilayer 11. In this way, the hysteresis loss of the cushion material 14 is reduced.

Although the restoration promoter is not particularly limited as long as the restoration promoter can promote restoration of the cushioning material 14 which has been displaced to the outside of the battery cell multilayer 11, examples thereof include a potting material, springs and the like. Among them, the springs are preferable due to its low friction.

Figure 4A:
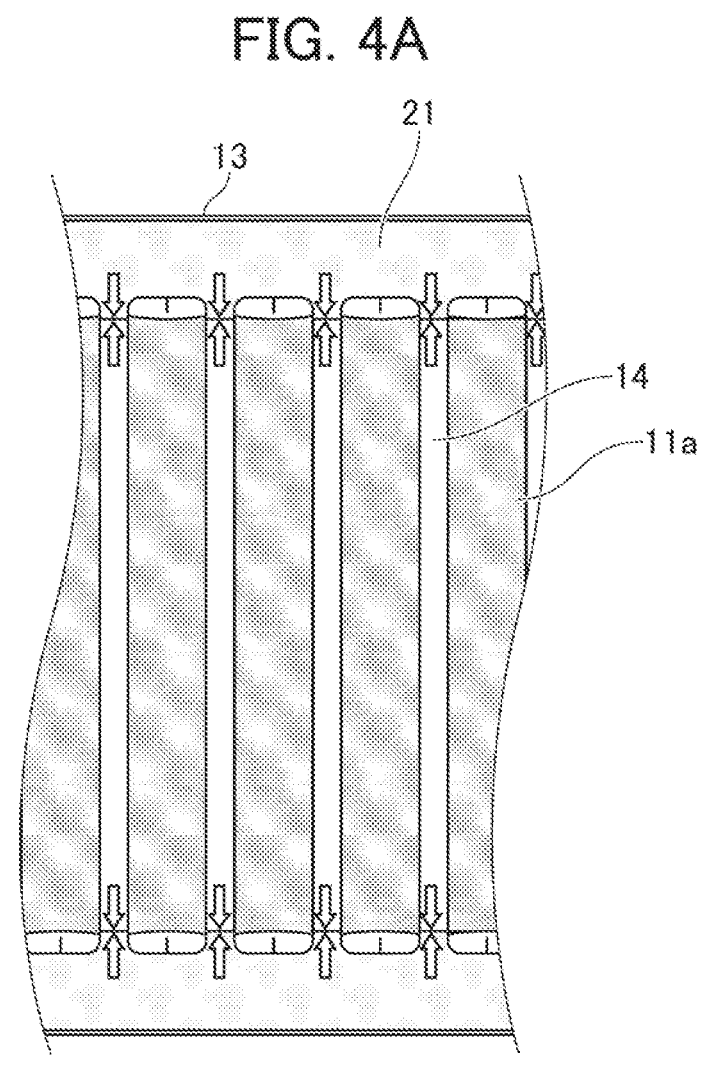

For example, potting is performed on the bind bars 13, and thus a potting material 21 is arranged among the bind bars 13, the cushioning material 14 and the battery cells 11a (see FIG. 4A). Here, a lightening portion (air) may be formed in the surface of the potting material 21 which is in contact with the bind bar 13. Although the material of the potting material 21 is not particularly limited, examples thereof include urethane resin, epoxy resin, silicone resin and the like.

Figure 4B:
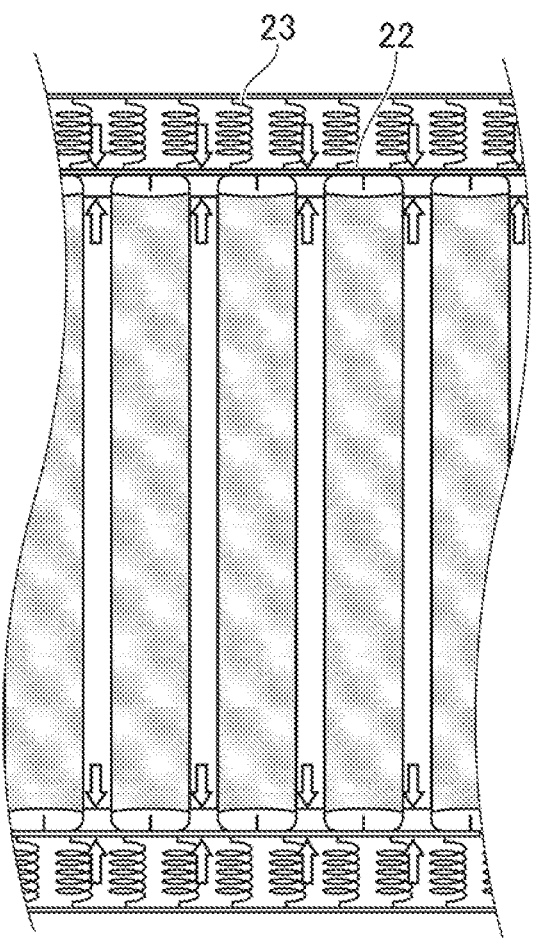

Springs 23 are arranged among the bind bars 13, the cushioning material 14 and the battery cells 11a via plate-shaped members 22 (see FIG. 4B). Although the material of the plate-shaped members 22 is not particularly limited, examples thereof include a metal, a resin and the like. Although the material of the springs 23 is not particularly limited, examples thereof include a metal and the like.

Although the battery cell 11a is not particularly limited, examples thereof include a non-aqueous electrolyte battery cell, a solid-state battery cell and the like. Since the surface stress is kept relatively constant even when the battery cell 11a is charged, the battery module 10 is particularly effective when a solid-state battery cell (in particular, a lithium metal solid-state battery cell) in which expansion and contraction caused by charging and discharging are large is used as the battery cell 11a.

Examples of the solid-state battery include a semi-solid-state lithium-ion battery, an all-solid-state lithium-ion battery, a semi-solid-state lithium metal battery, an all-solid-state lithium metal battery and the like.

A case where the solid-state battery is an all-solid-state lithium metal battery will be described below.

In the all-solid-state lithium metal battery, for example, a positive electrode current collector, a positive electrode composite layer, a solid electrolyte layer, a lithium metal layer and a negative electrode current collector are sequentially stacked.

Although the positive electrode current collector is not particularly limited, examples thereof include aluminum foil and the like.

The positive electrode composite layer includes a positive electrode active material, and may further include a solid electrolyte, a conductive aid, a binder and the like.

Although the positive electrode active material is not particularly limited as long as the positive electrode active material can absorb and release lithium ions, examples thereof include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, sulfur and the like.

Although the solid electrolyte of the solid electrolyte layer is not particularly limited as long as the solid electrolyte can conduct lithium ions, examples thereof include an oxide electrolyte, a sulfide electrolyte and the like.

Although the negative electrode current collector is not particularly limited, examples thereof include copper foil and the like.

Although the embodiment of the present invention has been described above, the present invention is not limited to the embodiment described above, and the embodiment described above may be changed as necessary without departing from the spirit of the present invention.

EXAMPLES

Although Examples of the present invention will be described below, the present invention is not limited to Examples below. Since it was difficult to directly evaluate the surface stress of a battery module, in the present Examples, a test piece imitating the battery module was used to evaluate a relationship between the surface stress and a compression displacement of a cushioning material.

Example 1

Figure 5:
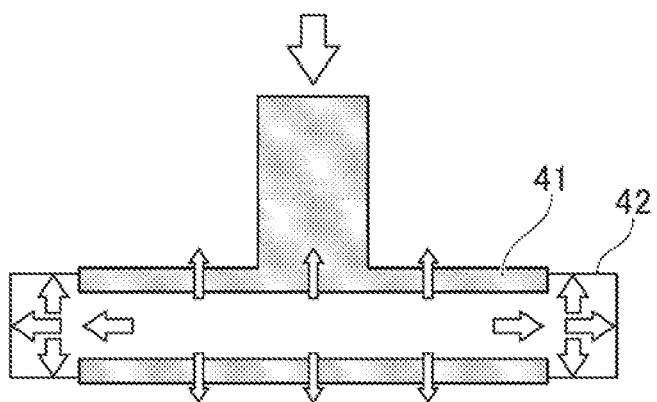
FIG. 5 is a cross-sectional view showing a test piece in Example 1.

In a jig 41 having a length of 52 mm and a width of 70 mm, a polyurethane elastomer (made by EXSEAL CO., LTD.) with a hardness of Asker C7 serving as a cushioning material 42 having a length of 52 mm, a width of 70 mm and a thickness of 5 mm was sandwiched, and thus a test piece was obtained (see FIG. 5). Here, the test piece in Example 1 included a displacement tolerant portion which was tolerant of a displacement to the outside of the jig 41 (in a left/right direction in the figure).

Example 2

A test piece was obtained in the same manner as in Example 1 except that a polyurethane elastomer (made by EXSEAL CO., LTD.) in which talc powder was applied to the surface was used as the cushioning material 42.

Comparative Example 1

Figure 6:
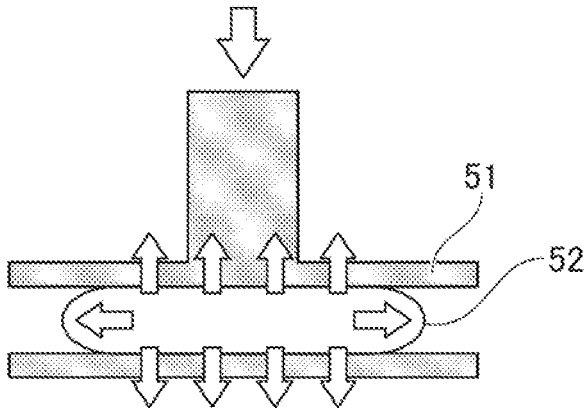
FIG. 6 is a cross-sectional view showing a test piece in Comparative Example 1.

In a jig 51 having a length of 52 mm and a width of 70 mm, a polyurethane elastomer (made by EXSEAL CO., LTD.) with a hardness of Asker C7 serving as a cushioning material 52 having a length of 20 mm, a width of 20 mm and a thickness of 5 mm was sandwiched, and thus a test piece was obtained (see FIG. 6). Here, since in the test piece of Comparative Example 1, the surface area of the cushioning material 52 was smaller than that of the jig 51, the test piece did not include a displacement tolerant portion which was tolerant of a displacement to the outside of the jig 51.

Comparative Example 2

A test piece was obtained in the same manner as in Comparative Example 1 except that a polyurethane elastomer (made by EXSEAL CO., LTD.) in which talc powder was applied to the surface was used as the cushioning material 52.

[Coefficient of Friction of Cushioning Material]

When a digital force gauge ZTA-1000N (made by IMADA CO., LTD.) was used to measure the maximum static coefficients of friction in a planar direction for the cushioning materials 42 in Examples 1 and 2, they were 1.758 and 0.015, respectively. Hence, it is found that when talc powder is applied to the surface of a urethane gel, the coefficient of friction is reduced.

[Relationship Between Surface Stress and Compression Displacement of Cushioning Material]

A servo pulser (made by Shimadzu Corporation) and a load cell of 10 kN were used to measure a relationship between the surface stress and the compression displacement of the cushioning material. Specifically, the cushioning material was compressed until a compression displacement of 70% was achieved at a compression speed of 0.002 mm/s.

Figure 7:
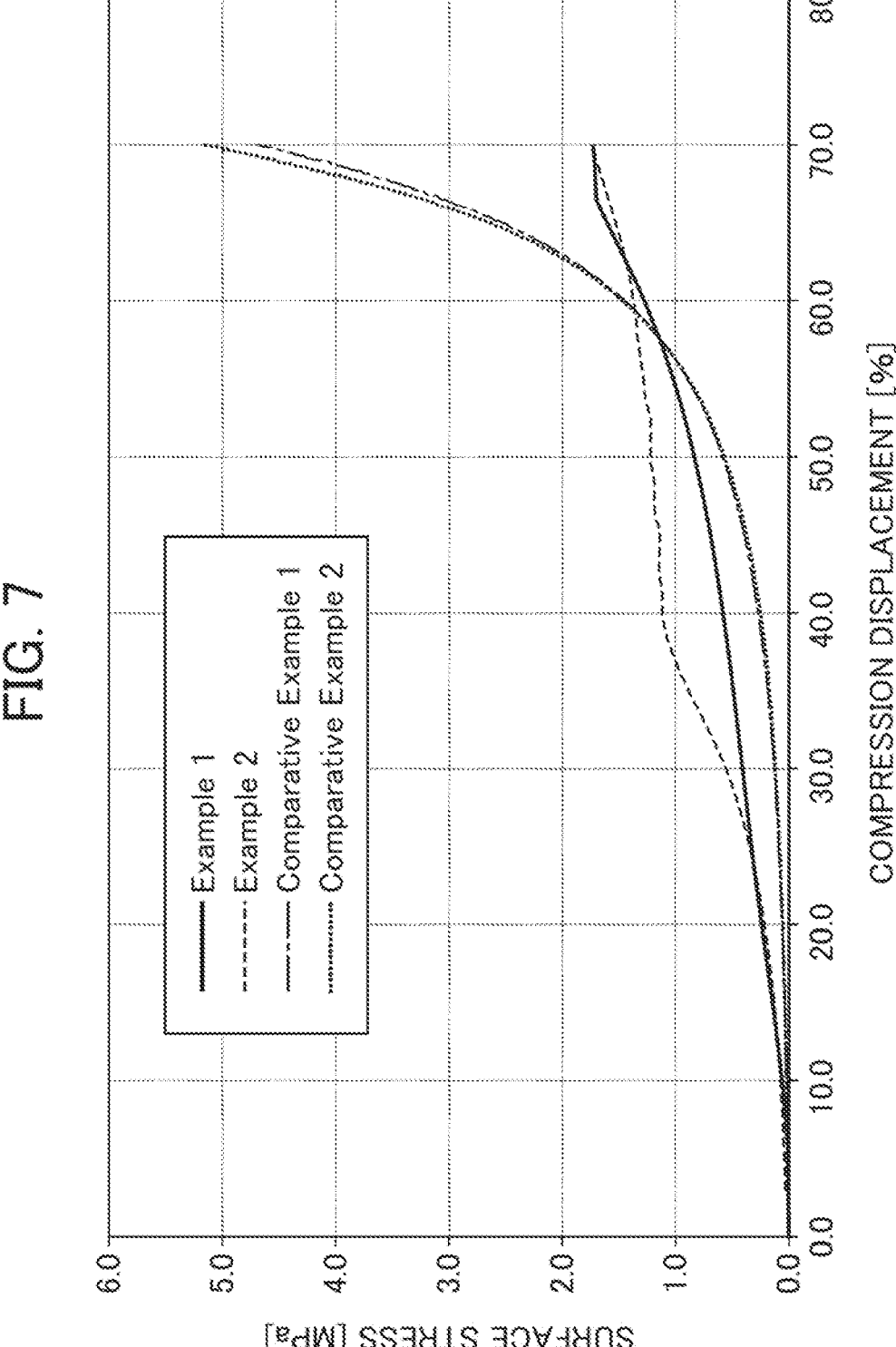
FIG. 7 is a graph showing a relationship between a surface stress and a compression displacement of a cushioning material in Examples 1 and 2 and Comparative Examples 1 and 2.

FIG. 7 shows the relationship between the surface stress and the compression displacement of the cushioning material in Examples 1 and 2 and Comparative Examples 1 and 2.

It is found from FIG. 7 that in Examples 1 and 2, even when the cushioning material 42 was compressed, the surface stress was kept relatively constant, and in other words, a plateau region of the surface stress was present. Hence, it is estimated that in a battery module having the same structure as the test pieces in Examples 1 and 2, even when a solid-state battery cell is charged, a surface stress is kept relatively constant.

By contrast, since the test pieces in Comparative Examples 1 and 2 did not include a displacement tolerant portion which was tolerant of a displacement to the outside of the jig 51, when the cushioning material 52 was compressed, the surface stress was increased quadratically, with the result that a plateau region of the surface stress was not present. In Comparative Examples 1 and 2, a cut was made in the end side surface of the cushion material 52. It is estimated that this is because the maximum stress part was produced in the cushioning material 52 and thus the stress was not dispersed.

EXPLANATION OF REFERENCE NUMERALS

10: battery module
11: battery cell multilayer
11a: battery cell
12: end plate
13: bind bar
14: cushioning material
15: displacement tolerant portion
21: potting material
22: plate-shaped member
23: spring
41, 51: jig
42, 52: cushioning material

What is claimed is:
1. A battery module comprising:
a plurality of battery cells;
a battery cell multilayer including the plurality of battery cells that are stacked together;
a pair of plate-shaped members provided at both ends of the battery cell multilayer in a stacking direction;
a cushioning material sandwiched between the battery cells and/or between the battery cell and the plate-shaped member, the cushioning material comprising a viscoelastic material; and
a displacement tolerant portion tolerant of a displacement of the cushioning material to a region that is present outside the battery cells when viewed in the stacking direction of the battery cell multilayer.
2. The battery module according to claim 1, wherein the viscoelastic material is a polyurethane thermoplastic elastomer.
3. The battery module according to claim 1, wherein fine particles having a particle diameter of 40 μm or less or a lubricating oil is present on a surface of the cushioning material.
4. The battery module according to claim 3, wherein the fine particles are talc powder.
5. The battery module according to claim 1, further comprising:
a restoration promoter configured to promote restoration of the cushioning material which has been displaced to the outside of the battery cell multilayer.

\* \* \* \* \*